March 1, 1949.   G. B. ZIMMERMAN ET AL   2,463,076
TREATMENT OF HYDROCARBONS
Filed May 31, 1943
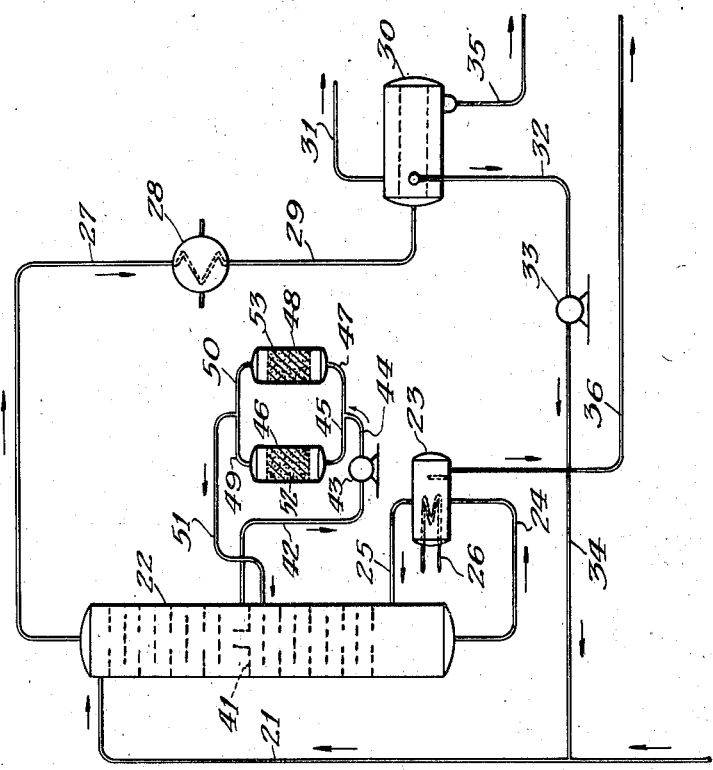
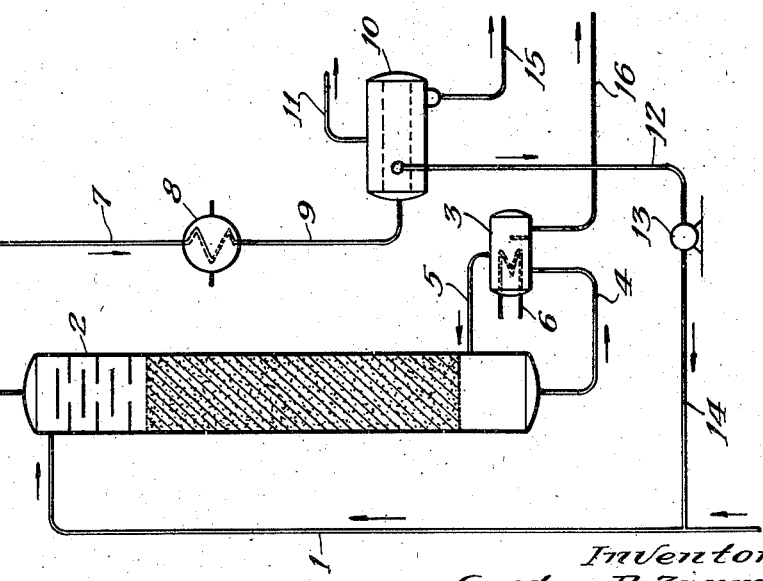
Inventors:
Gordon B. Zimmerman
Clarence G. Gerhold
By: Lee J. Gary
Attorney Patented Mar. 1, 1949

2,463,076

UNITED STATES PATENT OFFICE 2,463,076

TREATMENT OF HYDROCARBONS

Gordon B. Zimmerman and Clarence G. Gerhold, Chicago, Ill., assignors to Universal Oil Products Company, Chicago, Ill., a corporation of Delaware Application May 31, 1943, Serial No. 489,158

13 Claims. (Cl. 196—35)

This invention relates to a process for treating hydrocarbon mixtures to remove halogens therefrom. More particularly it relates to the treatment of synthetic hydrocarbons produced with active halide catalysts to remove the small amounts of organically combined halogen which may be present in the hydrocarbons and at the same time to remove any hydrogen halide which may be dissolved in the hydrocarbon mixture. The invention is particularly adapted to the treatment of hydrocarbons produced by the alkylation of isoparaffins with olefins using active fluoride catalyst including hydrogen fluoride or hydrofluoric acid, and mixtures comprising essentially hydrogen fluoride and boron fluoride.

The alkylation of branched-chain paraffins such as isobutane and isopentane with olefins to produce liquid hydrocarbons which are of great value as gasoline motor fuels because of their high antiknock properties has now assumed commercial importance. Active fluoride catalysts as heretofore mentioned are utilized in effecting the alkylation reaction, but it has been found that the resultant alkylation product frequently contains minor quantities of fluorine in combination with the hydrocarbons, possibly due to the interaction of hydrogen fluoride with the olefinic constituents of the reaction mixture under the influence of the catalyst.

Although the fluorine content of the alkylate is rarely very high, its presence is undesirable. It has been found that the presence of fluorine in alkylates is definitely objectionable because of its corrosive character, its tendency to readily react with various substances with which it comes into contact and thereby form undesirable products which may result in plugging of the pipe lines, and to its possible detrimental effect on the antiknock properties of the alkylate. Not only is the removal of fluorine from the products important for the above reasons, but also is the decomposition of the combined fluorine compounds important because the combined fluorine represents a loss of hydrogen fluoride which is thus no longer suitable for use as the catalyst.

In the alkylation process, after the reactants have been contacted with the catalyst, and the reaction has proceeded to the desired extent, the products are separated into a catalyst layer and a hydrocarbon layer. Due to the solubility of hydrogen fluoride in the hydrocarbons, the hydrocarbon layer will contain some dissolved hydrogen fluoride and will also contain organically combined fluoride compounds, such as alkyl fluorides. It is a particular feature of the present invention that the dissolved hydrogen fluoride may be separated from the hydrocarbons in the same fractionating zone in which the hydrogen fluoride formed by decomposition of the organically combined fluorine compounds is separated. Thus the hydrogen fluoride from both of these sources may be recovered in admixture and may be recycled to the alkylation reaction zone for further use therein.

In addition to the treatment of normally liquid hydrocarbon mixtures containing combined fluorine, the present invention is also applicable to the treatment of normally gaseous hydrocarbon fractions containing combined fluorine and which may or may not contain dissolved hydrogen fluoride. Thus the invention is particularly applicable to the treatment of a hydrocarbon fraction containing hydrocarbons having four carbon atoms to the molecule and containing combined fluorine compounds as an impurity therein.

In a broad aspect the present invention relates to treating a hydrocarbon mixture containing an organic halogen compound to remove the halogen, which comprises fractionating and contacting the mixture with a dehydrohalogenating agent under dehydrohalogenating conditions to decompose at least a portion of said organically combined halogen compound into hydrogen halide and hydrocarbon, and to separate the hydrogen halide from the hydrocarbon.

In a more specific aspect the present invention relates to the purification of a hydrocarbon mixture synthesized in the presence of a halide catalyst and containing dissolved hydrogen halide and a relatively small amount of an organically combined halogen compound, which comprises fractionating said hydrocarbon mixture in a fractionating zone to remove at least a portion of the dissolved hydrogen halide, contacting the remaining mixture of hydrocarbon and organically combined halogen compound with a dehydrohalogenation agent under dehydrohalogenating conditions to decompose at least a portion of said organically combined halogen into hydrogen halide and hydrocarbon, and fractionating the resulting products in said fractionating zone.

In one specific embodiment the present invention comprises a process for purifying an alkylation product produced in the presence of an active fluoride catalyst and containing dissolved hydrogen fluoride and a relatively small amount of an organically combined fluorine compound, which comprises fractionating said alkylation product in the presence of a dehydrofluorinating agent under conditions to decompose said organically combined fluorine compound into hydrogen fluoride and hydrocarbon, and to separate the hydrogen fluoride originally dissolved in the alkylation product and the hydrogen fluoride formed by said decomposition, from the hydrocarbons.

While the present invention is directed particularly to the removal of fluorine from hydrocarbon mixtures, it is applicable to the removal of the other halogens, including chlorine, bromine and iodine, but not necessarily under the same conditions of operation or not necessary with equivalent results.

Any suitable dehydrofluorinating agent may be used within the scope of the present invention and thus may include such dehydrofluorinating agents as metals, such as aluminum, iron, lead, etc., which preferably are in porous condition; metal oxides such as alumina which may be substantially pure or which may comprise aluminous minerals such as bauxite; metal salts and particularly the fluorides, such as aluminum fluoride, calcium fluoride, etc., which likewise are preferably in porous condition. These agents may be dispersed on suitable carriers.

It is understood that the above dehydrofluorinating agents are not necessarily equivalent in their action. In fact, experiments have shown that some of the above agents will react with the liberated hydrogen fluoride at least during the initial portion of the treating cycle. It is therefore preferred to use agents, such as aluminum, which act more like a catalyst to decompose the organically combined fluorine into hydrogen fluoride and hydrocarbon and thus releases the hydrogen fluoride for separation during the fractionation treatment and eventually for recycling to the alkylation reaction zone for further use therein. Some of the above reagents, such as calcium fluoride, appear to react with hydrogen fluoride during the initial stages of the treatment but do release hydrogen fluoride during the later stages of the treatment. In certain cases, however, it may be satisfactory to utilize the other types of reagents which react with the hydrogen fluoride and subsequently to recover the fluorine from the reagent by suitable purging, stripping or other means.

The temperature and pressure to be employed will depend upon the particular hydrocarbon fraction being subjected to treatment. The temperature should be sufficient to effect the desired fractionation and the pressure should be sufficient to liquefy the bottoms product in the fractionating zone. In general, the temperature employed is usually in a range of from about 100° to about 400° F. and the pressure may range from substantially atmospheric to about 500 pounds or more.

The invention will be further described in the accompanying diagrammatic drawings which illustrate several embodiments of the invention.

Fig. 1 is a preferred embodiment in which the dehydrofluorinating agent is disposed within the fractionating zone.

Fig. 2 is another embodiment of the invention in which the dehydrofluorinating agent is disposed in external zones which are in communication with the fractionating zone.

Referring to Fig. 1 of the drawing, the hydrocarbon fraction is introduced to the process at the desired temperature and pressure, from a source and by suitable means not shown, through line 1 to fractionating zone 2. Fractionating zone 2 may comprise any suitable apparatus for effecting the desired fractionation. In the case here illustrated, fractionating zone 2 comprises a fractionating column having fractionating means such as bubble trays, baffle plates, side-to-side pans, etc., disposed in the upper portion thereof and a bed of the dehydrohalogenating agent disposed in the mid portion thereof. Reboiler 3 is in communication with zone 2 by means of supply line 4 and return line 5. Reboiler 3 may be equipped with any suitable heating means such as closed coil 6. It is understood that an internal reboiler disposed within the lower portion of zone 2 or any other suitable heating means may be employed.

The temperature maintained in the lower portion of zone 2 is regulated to obtain vaporization of the lighter products, which are removed from the upper portion of zone 2 through line 7. These lighter products will usually comprise hydrogen fluoride and some lighter hydrocarbon products such as propane, if any, and butane. The overhead product may be passed through line 7, condenser 8 and line 9 to receiver 10. Receiver 10 is operated under sufficient pressure to condense an acid layer and a hydrocarbon layer and at the same time to release any lighter hydrocarbons through vent line 11. The hydrocarbon layer, which probably comprises primarily butane, may be withdrawn from the receiver 10 through line 12 and may then be supplied to pump 13 by means of which it may be returned through lines 14 and 1 to the upper portion of zone 2 to act as a cooling and refluxing medium therein.

Hydrogen fluoride may be withdrawn from receiver 10 through line 15 and preferably is recycled to the alkylation process by well known means not illustrated. The dehydrofluorinated product is withdrawn from reboiler 3 through line 16 and may be subjected to distillation or other treatment as desired.

The embodiment of Fig. 2 is similar to that shown in Fig. 1 and differs therefrom in that the packing material is disposed in external but adjacent zones. Referring to Fig. 2 the hydrocarbon fraction is introduced through line 21 and is supplied to fractionating zone 22 which may be similar to the heretofore described zone 2 with the exception that it will not contain the dehydrofluorinating agent. In this embodiment of the invention a side cut is withdrawn from plate 41 in zone 22 and is directed by way of line 42 to pump 43, by means of which it is directed through line 44 and then may be supplied through line 45 to treating tower 46 or through line 47 to treating tower 48. The products from the treating towers are then returned by way of lines 49, 50 and 51 to fractionating column 22.

It is understood that although two treating zones are illustrated in the drawings, one or a plurality of three or more zones may be used. Treating zones 46 and 48 are packed with a suitable dehydrofluorinating agent as indicated at 52 and 53. When the dehydrofluorinating agent is more of a catalytic character, it usually will be satisfactory to employ only one of such treating zones. On the other hand, if the dehydrofluorinating agent employed is more of the reagent type which reacts at least in part with the hydrogen fluoride, preferably at least two such zones are employed so that one may be in service while the reagent in the other zone may either be subjected to regeneration or removed from the treating zone and replaced by fresh treating agent.

The remaining description of Fig. 2 is similar to that of Fig. 1. Thus, reboiler 23 is similar to reboiler 3 and is in communication with zone 22 by way of lines 24 and 25 and contains closed coil 26. The overhead products from zone 22 are directed through line 27, condenser 28 and line 29 into receiver 30 having vent line 31 and hydrocarbon withdrawal line 32, pump 33 and line 34. Hydrogen fluoride is withdrawn through line 35 and the dehydrofluorinated products are withdrawn through line 36.

In another embodiment of the invention a series of treating zones may be disposed at different intervals along the line of flow of the hydrocarbon mixture in the fractionating zone. Thus, for example, a system of two treating zones as illustrated in Fig. 2 may be disposed about one-third way down from the top of fractionating zone 22, while another such system may be disposed at a mid-point of the fractionating zone and still another such system may be disposed about two-thirds down from the top of the fractionating zone.

In the interest of simplifying the drawing, valves, and other similar appurtenances are not shown since the drawing is intended primarily as diagrammatic. For example, in Fig. 2, valves would be required in lines 45 and 47 and in lines 49 and 50, as well as in various other lines shown in the drawings.

One important advantage of the present invention is due to the fact that the decomposition of the organically combined fluorine compound into hydrogen fluoride and hydrocarbon is an equilibrium reaction. Therefore, by removing the hydrogen fluoride from the fractionating zone shortly after it is formed, in the manner herein described, the equilibrium is shifted towards the production of additional hydrogen fluoride. Thus the decomposition of the organically combined fluorine compound may be effected to a greater extent than would otherwise be obtainable unless an excessive number of treating and fractionating zones were employed which, of course, is not economically feasible. This advantage is inherent in the operation illustrated in Figure 1 of the drawing. The operation illustrated in Figure 2 of the drawing is particularly applicable to operations in which the dehydrofluorinating agent becomes inactivated after prolonged use and, when at least two such external zones are employed, the dehydrofluorinating agent may be reactivated or replaced without disrupting the continuous operation of the present process. In order to obtain the benefits of both of these operations, one may employ the embodiment of the invention heretofore described in which at least two such systems, each comprising at least two treating zones, is utilized.

The following example is introduced for the purpose of further illustrating the novelty and utility of the present invention but not with the intention of unduly limiting the same.

Isobutane was alkylated by butenes in the presence of hydrogen fluoride catalyst at a temperature of 100° F. A hydrocarbon layer was separated from the catalyst layer and the hydrocarbon layer was then introduced into a stripping zone. The stripping zone comprised a vessel 7' long by 3" wide and was equipped with an internal closed coil in the lower portion thereof. A heating medium was introduced through the closed coil in order to maintain a temperature of about 205° F. in the lower portion of the stripping zone. The upper portion of the stripping zone was maintained at a temperature of about 120° F. The stripping zone was operated at a pressure of about 175 pounds per square inch. A bed 4' 7" high of aluminum turnings of greater than 10 mesh was disposed in the stripping zone and was supported therein 12 inches from the bottom by means of a perforated plate.

The hydrocarbon layer was passed downwardly through the stripping zone. The hydrogen fluoride liberated therein was removed from the upper portion of the stripping zone, while the liquid hydrocarbons were removed from the lower portion thereof and were supplied to a stabilizing column.

The alkylate prior to introduction into the stripping zone had a fluorine content of about 0.01%, while the fluorine content of the final alkylate as withdrawn from the lower portion of the stabilizing column had a fluorine content of about 0.0001%.

We claim as our invention:

1. A process for purifying a hydrocarbon liquid containing a relatively small amount of an organic halogen compound and dissolved hydrogen halide, which comprises fractionating the hydrocarbon liquid under refluxing conditions to separate the same into a liquid bottoms product and an overhead vaporous product containing said hydrogen halide, during the fractionation of the hydrocarbons contacting at least a portion thereof containing said organic halogen compound with a solid dehydrohalogenating agent and decomposing the organic halogen compound into hydrogen halide and hydrocarbon by the action of said agent, and removing the thus formed hydrogen halide in said overhead vaporous product.

2. A process for purifying a hydrocarbon liquid containing a relatively small amount of an organic halogen compound as an impurity, which comprises fractionating the hydrocarbon material in a fractionating zone having an increasing temperature gradient from top to bottom whereby to separate the hydrocarbon material under refluxing conditions into an overhead vaporous product and a liquid bottoms product, contacting the hydrocarbons intermediate the top and bottom of said zone with a dehydrohalogenating agent at a dehydrohalogenating temperature to decompose the organic halogen compound into hydrogen halide and hydrocarbon, and removing the hydrogen halide in said overhead vaporous product.

3. A process for purifying a hydrocarbon liquid containing a relatively small amount of an organic halogen compound as an impurity, which comprises fractionating the hydrocarbon material in a fractionating zone having an increasing temperature gradient from top to bottom whereby to separate the hydrocarbon material under refluxing conditions into an overhead vaporous product and a liquid bottoms product, removing from an intermediate point in the height of the fractionating zone a liquid side cut containing at least a portion of said organic halogen compound and contacting the same with a dehydrohalogenating agent at a dehydrohalogenating temperature to decompose the organic halogen compound into hydrogen halide and hydrocarbon, returning the thus treated side cut to an intermediate point of the fractionating zone for separation of the hydrogen halide in said zone, and removing the hydrogen halide in said overhead vaporous product.

4. A process for purifying a hydrocarbon liquid containing a dissolved hydrogen halide and an organic halogen compound, which comprises introducing said liquid to the upper portion of a fractionating zone having an increasing temperature gradient from top to bottom, liberating dissolved hydrogen halide from the hydrocarbon liquid in the upper portion of said zone, contacting the remaining hydrocarbons containing the organic halogen compound with a dehydrohalogenating agent at a dehydrohalogenating temperature to decompose the organic halogen compound into hydrogen halide and hydrocarbon, fractionating the resultant products in said zone under refluxing conditions together with the hydrocarbon feed undergoing fractionation, removing from the upper portion of the fractionating zone a hydrogen halide-containing overhead vaporous product, and removing from the lower portion of said zone a substantially halogen-free liquid bottoms product.

5. The process as defined in claim 4 further characterized in that said dehydrohalogenating agent is disposed within the fractionating zone below the point of introduction of said liquid thereto.

6. The process as defined in claim 4 further characterized in that said dehydrohalogenating agent is disposed exteriorly of the fractionating zone, said remaining hydrocarbons being withdrawn from and said resultant products being introduced to the fractionating zone below the point of introduction of said liquid.

7. A process for purifying a hydrocarbon liquid containing a relatively small amount of an organic fluorine compound and dissolved hydrogen fluoride, which comprises fractionating the hydrocarbon liquid under refluxing conditions to separate the same into a liquid bottoms product and an overhead vaporous product containing said hydrogen fluoride, during the fractionation of the hydrocarbons contacting at least a portion thereof containing said organic fluorine compound with a solid dehydrofluorinating agent and decomposing the organic fluorine compound into hydrogen fluoride and hydrocarbon by the action of said agent, and removing the thus formed hydrogen fluoride in said overhead vaporous product.

8. A process for purifying a hydrocarbon liquid containing a relatively small amount of an organic fluorine compound as an impurity, which comprises fractionating the hydrocarbon material in a fractionating zone having an increasing temperature gradient from top to bottom whereby to separate the hydrocarbon material under refluxing conditions into an overhead vaporous product and a liquid bottoms product, contacting the hydrocarbons intermediate the top and bottom of said zone with a dehydrofluorinating agent at a dehydrofluorinating temperature to decompose the organic fluorine compound into hydrogen fluoride and hydrocarbon, and removing the hydrogen fluoride in said overhead vaporous product.

9. A process for purifying a hydrocarbon liquid containing a relatively small amount of an organic fluorine compound as an impurity, which comprises fractionating the hydrocarbon material in a fractionating zone having an increasing temperature gradient from top to bottom whereby to separate the hydrocarbon material under refluxing conditions into an overhead vaporous product and a liquid bottoms product, removing from an intermediate point in the height of the fractionating zone a liquid side cut containing at least a portion of said organic fluorine compound and contacting the same with a dehydrofluorinating agent at a dehydrofluorinating temperature to decompose the organic fluorine compound into hydrogen fluoride and hydrocarbon, returning the thus treated side cut to an intermediate point of the fractionating zone for separation of the hydrogen fluoride in said zone, and removing the hydrogen fluoride in said overhead vaporous product.

10. A process for purifying a hydrocarbon liquid containing dissolved hydrogen fluoride and an organic fluorine compound, which comprises introducing said liquid to the upper portion of a fractionating zone having an increasing temperature gradient from top to bottom, liberating dissolved hydrogen fluoride from the hydrocarbon liquid in the upper portion of said zone, contacting at least a portion of the hydrocarbons containing the organic fluorine compound with a solid dehydrofluorinating agent in a lower portion of said zone and decomposing the organic fluorine compound into hydrogen fluoride and hydrocarbon by the action of said agent, passing the resultant vaporous products upwardly within said zone in countercurrent contact with the hydrocarbon liquid undergoing fractionation, removing from the upper portion of the fractionating zone a hydrogen fluoride-containing overhead vaporous product, and removing from the lower portion of said zone a substantially fluorine-free liquid bottoms product.

11. A process for purifying a hydrocarbon liquid containing relatively small amounts of dissolved hydrogen fluoride and an organic fluorine compound, which comprises introducing the liquid to a fractionating zone having an increasing temperature gradient from top to bottom, initially separating dissolved hydrogen fluoride as vapor from the hydrocarbon liquid in said zone, thereafter contacting portions of the hydrocarbons containing said organic fluorine compound with a solid dehydrofluorinating agent in a region of said zone maintained at temperatures in the range of from about 100° F. to about 400° F., thereby decomposing the organic fluorine compound into hydrogen fluoride and hydrocarbon, simultaneously fractionating the hydrocarbons in said zone to separate therefrom the hydrogen fluoride thus liberated from said organic compound and to combine this hydrogen fluoride with dissolved hydrogen fluoride separated as aforesaid from the hydrocarbon liquid, removing from the upper portion of the fractionating zone an overhead vaporous product containing said dissolved and liberated hydrogen fluoride, and removing from the lower portion of said zone a substantially fluorine-free hydrocarbon liquid.

12. A process for purifying a hydrocarbon liquid containing relatively small amounts of dissolved hydrogen fluoride and an organic fluorine compound, which comprises introducing the liquid to a fractionating zone having an increasing temperature gradient from top to bottom, initially separating dissolved hydrogen fluoride as vapor from the hydrocarbon liquid in said zone, thereafter contacting portions of the hydrocarbons containing said organic fluorine compound with metallic aluminum in a region of said zone maintained at temperatures in the range of from about 100° F. to about 400° F., thereby decomposing the organic fluorine compound into hydrogen fluoride and hydrocarbon, simultaneously fractionating the hydrocarbons in said zone to separate therefrom the hydrogen fluoride thus liberated from said organic compound and to combine this hydrogen fluoride with dissolved hydrogen fluoride separated as aforesaid from the hydrocarbon liquid, removing from the upper portion of the fractionating zone an overhead vaporous product containing said dissolved and liberated hydrogen fluoride and removing from the lower portion of said zone a substantially fluorine-free hydrocarbon liquid.

13. A process for purifying a hydrocarbon liquid containing dissolved hydrogen fluoride and an organic fluorine compound, which comprises introducing said liquid to the upper portion of a fractionating zone having an increasing temperature gradient from top to bottom, liberating dissolved hydrogen fluoride from the hydrocarbon liquid in the upper portion of said zone, contacting at least a portion of the hydrocarbons containing the organic fluorine compound with metallic aluminum in a lower region of said zone maintained at temperatures in the range of from about 100° F. to about 400° F., thereby decomposing the organic fluorine compound into hydrogen fluoride and hydrocarbon, passing vapors cooled in said lower region upwardly within said zone in countercurrent contact with the hydrocarbon liquid undergoing fractionation to separate the last-mentioned hydrogen fluoride from hydrocarbons, removing from the upper portion of the fractionating zone an overhead vaporous product containing the last-mentioned hydrogen fluoride and dissolved hydrogen fluoride liberated in the upper portion of said zone, and removing from the lower portion of said zone a substantially fluorine-free liquid bottoms product.

GORDON B. ZIMMERMAN.
CLARENCE G. GERHOLD.

REFERENCES CITED

The following references are of record in the file of this patent:

UNITED STATES PATENTS

| Number | Name | Date |
| --- | --- | --- |
| 1,801,213 | Teplitz | Apr. 14, 1931 |
| 1,866,800 | Deanesly | July 12, 1932 |
| 1,869,781 | Shiffler et al. | Aug. 2, 1932 |
| 1,934,068 | Jolly et al. | Nov. 7, 1933 |
| 2,105,874 | Aldridge et al. | Jan. 18, 1938 |
| 2,164,334 | Marks | July 9, 1939 |
| 2,205,411 | Howard | June 25, 1940 |
| 2,306,993 | Lovell et al. | Dec. 29, 1942 |
| 2,310,327 | Sweeney | Feb. 9, 1943 |
| 2,310,837 | Carpenter et al. | Feb. 9, 1943 |
| 2,320,629 | Matuszak | June 1, 1943 |
| 2,333,648 | Grosse et al. | Nov. 9, 1943 |
| 2,341,567 | Moriarty | Feb. 15, 1944 |
| 2,356,357 | Schlesman et al. | Aug. 22, 1944 |

FOREIGN PATENTS

| Number | Country | Date |
| --- | --- | --- |
| 107,239 | Australia | Apr. 20, 1939 |